United States Patent [19]
Hinton

[11] Patent Number: 5,081,790
[45] Date of Patent: Jan. 21, 1992

[54] SELF-MAINTENANCE PLANTER

[76] Inventor: Robert A. Hinton, 14006 Fairoak Crossing, San Antonio, County of Bexar, Tex. 78231-1914

[21] Appl. No.: 198,185

[22] Filed: May 24, 1988

[51] Int. Cl.⁵ .............................................. A01G 9/02
[52] U.S. Cl. ......................................................... 47/81
[58] Field of Search ........................................ 47/17–19, 47/48.5, 59, 70, 79, 80, 81, 82

[56] References Cited

U.S. PATENT DOCUMENTS

| | | | |
|---|---|---|---|
| 1,977,827 | 10/1934 | Kneller | 47/81 |
| 2,300,776 | 11/1942 | Collins | 47/81 |
| 3,676,953 | 7/1972 | Delogne | 47/81 |
| 3,813,813 | 6/1974 | Powell | 47/81 |
| 4,052,818 | 10/1977 | Hagerty | 47/81 |
| 4,173,098 | 11/1979 | Smith | 47/70 |
| 4,745,707 | 5/1988 | Newby | 47/79 |

FOREIGN PATENT DOCUMENTS 2901354 7/1980 Fed. Rep. of Germany .......... 47/81

Primary Examiner—Danton D. DeMille

[57] ABSTRACT

A self-maintenance planter device for the purpose of supporting, nurturing, watering, and feeding a plant organism is disclosed. The planter includes the components of a water/absorbent reservoir, a soil support plate, a water addition tube and cap, and one or more conduit wicks to accomodate bidirectional water flow between the water/adsorbent reservoir and the potting soil. The planter device is constructed to promote time periods of reversed water flow from the potting soil through the conduit wicks to the water/absorbent reservoir. Various noxious substances such as mercaptans are flushed from the potting soil into the absorbent/water reservoir, and the noxious substances are physically or chemically absorbed into the absorbent substance, thereby providing a purified environment for nurture and sustenance of plant organisms for extended time intervals.

1 Claim, 6 Drawing Sheets

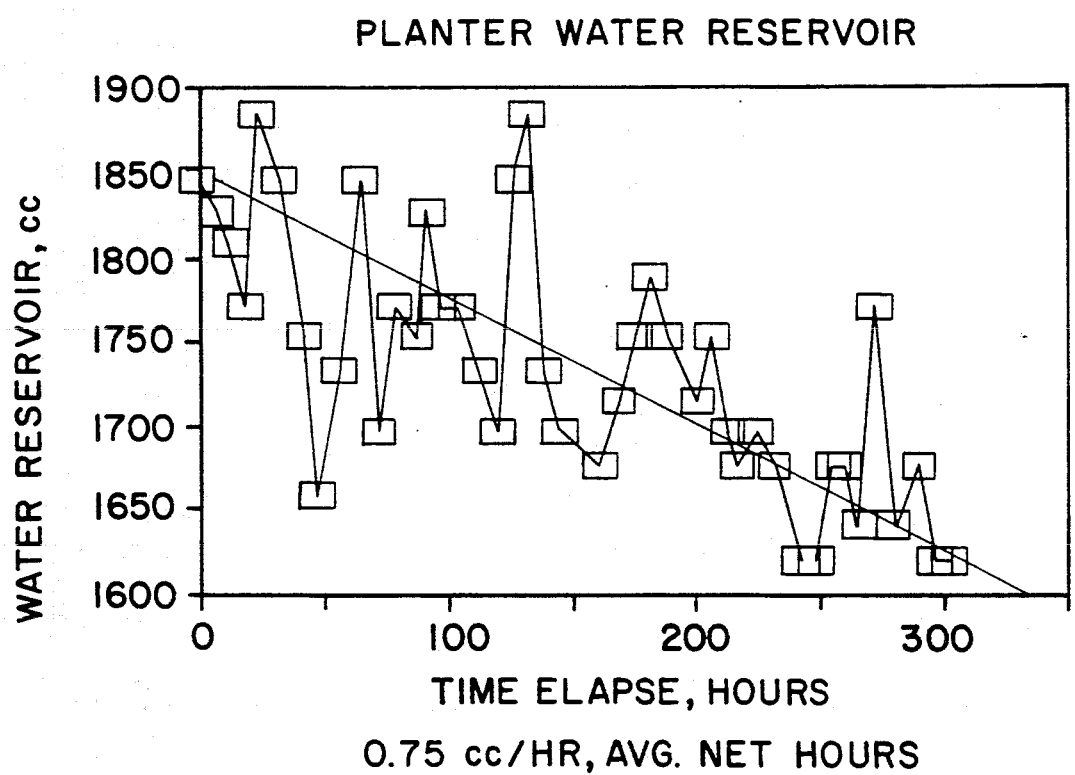

Self-Watering Planter
Operating Data

June, 1986

| Date | Time | WL,32nds | WL, cc | Use, cc | T.E.,Hrs. | cc/Hr |
|---|---|---|---|---|---|---|
| 6/5  | 23:00 | 98  | 1847 | 0    | 0.00   |       |
| 6/6  | 06:30 | 97  | 1828 | -19  | 7.50   | -2.5  |
|      | 12:10 | 96  | 1809 | -19  | 13.13  | -3.4  |
|      | 18:00 | 94  | 1771 | -38  | 19.00  | -6.4  |
|      | 23:30 | 100 | 1885 | 113  | 24.50  | 20.6  |
| 6/7  | 08:00 | 98  | 1847 | -38  | 33.00  | -4.4  |
|      | 17:20 | 93  | 1753 | -94  | 42.33  | -10.1 |
|      | 22:30 | 88  | 1658 | -94  | 47.50  | -18.2 |
| 6/8  | 07:00 | 92  | 1734 | 75   | 56.00  | 8.9   |
|      | 16:45 | 98  | 1847 | 113  | 65.75  | 11.6  |
|      | 23:10 | 90  | 1696 | -151 | 72.13  | -23.6 |
| 6/9  | 05:45 | 94  | 1771 | 75   | 78.75  | 11.4  |
|      | 14:10 | 93  | 1753 | -19  | 87.13  | -2.3  |
|      | 19:00 | 97  | 1828 | 75   | 92.00  | 15.5  |
|      | 23:00 | 94  | 1771 | -57  | 96.00  | -14.1 |
| 6/10 | 07:25 | 94  | 1771 | 0    | 104.40 | 0.0   |
|      | 15:37 | 92  | 1734 | -38  | 112.50 | -4.7  |
|      | 23:00 | 90  | 1696 | -38  | 120.00 | -5.0  |
| 6/11 | 06:00 | 98  | 1847 | 151  | 127.00 | 21.5  |
|      | 12:00 | 100 | 1885 | 38   | 133.00 | 6.3   |
|      | 17:30 | 92  | 1734 | -151 | 138.50 | -27.4 |
|      | 23:20 | 90  | 1696 | -38  | 144.33 | -6.5  |
| 6/12 | 15:30 | 89  | 1677 | -19  | 160.47 | -1.2  |
|      | 23:30 | 91  | 1715 | 38   | 168.50 | 4.7   |
| 6/13 | 06:00 | 93  | 1753 | 38   | 175.00 | 5.8   |
|      | 12:30 | 95  | 1790 | 38   | 181.50 | 5.8   |
|      | 18:15 | 93  | 1753 | -38  | 187.25 | -6.6  |
| 6/14 | 07:00 | 91  | 1715 | -38  | 200.00 | -3.0  |
|      | 12:50 | 93  | 1753 | 38   | 205.83 | 6.5   |
|      | 19:23 | 90  | 1696 | -57  | 211.60 | -9.8  |
|      | 23:00 | 89  | 1677 | -19  | 216.00 | -4.3  |
| 6/15 | 06:40 | 90  | 1696 | 19   | 223.67 | 2.5   |
|      | 14:00 | 89  | 1677 | -19  | 231.00 | -2.6  |
|      | 23:30 | 86  | 1621 | -57  | 240.50 | -6.0  |
| 6/16 | 06:20 | 86  | 1621 | 0    | 247.30 | 0.0   |
|      | 12:50 | 89  | 1677 | 57   | 253.80 | 8.7   |
|      | 17:45 | 89  | 1677 | 0    | 259.12 | 0.0   |
|      | 23:00 | 87  | 1640 | -38  | 264.00 | -7.7  |
| 6/17 | 06:30 | 94  | 1771 | 132  | 271.50 | 17.6  |
|      | 13:15 | 87  | 1640 | -132 | 278.25 | -19.5 |
|      | 18:50 | 88  | 1658 | 19   | 283.75 | 3.4   |
|      | 23:30 | 89  | 1677 | 19   | 288.50 | 4.0   |
| 6/18 | 05:30 | 86  | 1621 | -57  | 294.50 | -9.4  |
|      | 12:00 | 86  | 1621 | 0    | 300.50 | 0.0   |

Water Use= 0.752 cc/hr

FIG. 6

SELF-MAINTENANCE PLANTER

BACKGROUND OF THE INVENTION

1. Field of the Invention

The present invention relates to the field of plant husbandry, and more particularly refers to a device for physical support, nurture, watering, and soil purification of a potted plant. The invention provides for removal of impurities which cause sour soil conditions by physical absorption.

2. Description of the Prior Art

Many devices have been invented, developed, and manufactured to nurture plants with a minimum of personal attention, service, and maintenance. These inventions have been searched in class/subclasses 47/79,80,81 and Digest 4. The following patent references provide specific citations of the state of the invention art in the pertinent classifications.

U.S. Pat. No. 3,534,498 to Herrli (1970), uses a wick to transport water by capillary action to the plant pot.

U.S. Pat. No. 4,339,891 to Bassett (1982), describes a device for containing water, supporting a plant pot, and using one or more wicks to supply water to the pot soil.

U.S. Pat. No. 4,324,070 to Swisher (1982), describes a self-watering planter which utilizes one or more wick conduits, and minimizes evaporation losses from the water reservoir and wick conduit. Many of the inventions have contributed to the development of the state of the art. Relevant disclosure and classes may be cited:

| | | | |
|---|---|---|---|
| 265,097 | 9/1882 | Johnston | 47/81 |
| 320,588 | 6/1885 | Rhodes | 47/81 |
| 1,264,096 | 4/1918 | Lelievre | 47/81 |
| 1,342,786 | 6/1920 | White | 47/81 |
| 3,786,598 | 1/1974 | Stadelhofer | 47/81 |
| 3,975,860 | 8/1976 | Harned et al | 47/81 |

None of the prior art devices have provided an easily assembled and maintained system which will adsorb impurities from the planter soil and prevent the condition of souring of the planter.

OBJECTS OF THE INVENTION

It is an object of the invention to provide a self-watering planter with an intrinsic facility for self-purification by absorption of impurities in the water reservoir.

It is an additional object to provide a self-watering planter which facilitates bidirectional water flow between the water reservoir and the potting soil.

It is a further object to provide a planter design which diminishes the amount of maintenance and service time and attention.

It is still another object to provide a planter which is attractive and decorative, of few component parts, easily manufactured and assembled, and adaptable to many different sizes and shapes.

SUMMARY OF THE INVENTION

These and other objects, advantages, and functions are achieved by the present invention. The planter of this invention provides one or more wicks to accommodate water flow between the planter potting soil and the water reservoir. The flow of water through the wicks is bidirectional. For a portion of time, water flows from the water reservoir into the potting soil. For another portion of time, the flow of water is reversed from the potting soil into the reservoir. The flow of water from the potting soil includes dissolved chemicals which are noxious to plant growth, development, and nurture. These noxious substances are removed from the water by physical and chemical absorption onto the surface of absorbent substances within the water reservoir.

DESCRIPTION OF THE DRAWINGS

In the drawings

FIG. 4 is a graph which shows the variation of the water level in the water reservoir as a function of time.

FIG. 6 is a table of operating data for one embodiment of the invention during the time interval from June 5 through June 18, 1986.

DETAILED DESCRIPTION OF THE PREFERRED EMBODIMENTS

Figure 1:
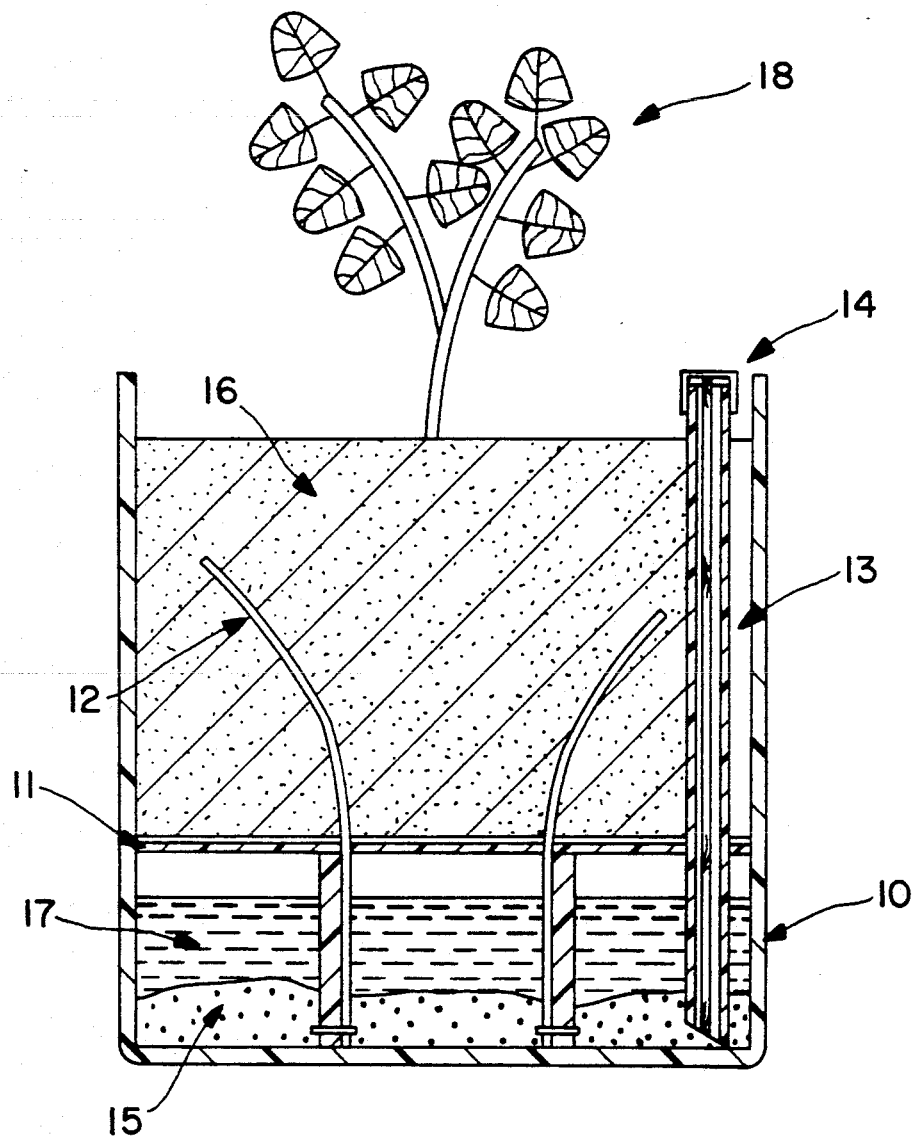
FIG. 1 is an elevation drawing of the invention, with a vertical, centerline, cross-section perspective.
Figure 2A:
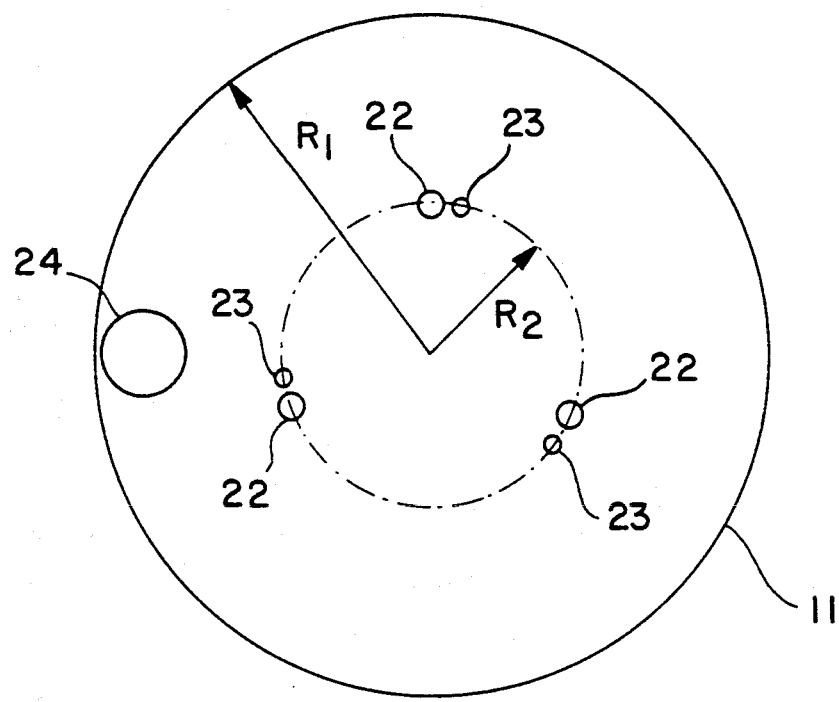
FIG. 2 is the soil support plate from the bottom, centerline view in the upper drawing, and a standard 90 degree rotation view in the lower drawing.
Figure 2B:
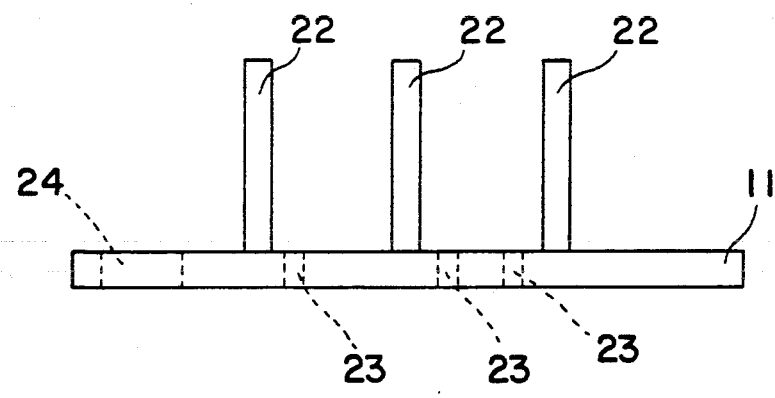
Figure 3A:
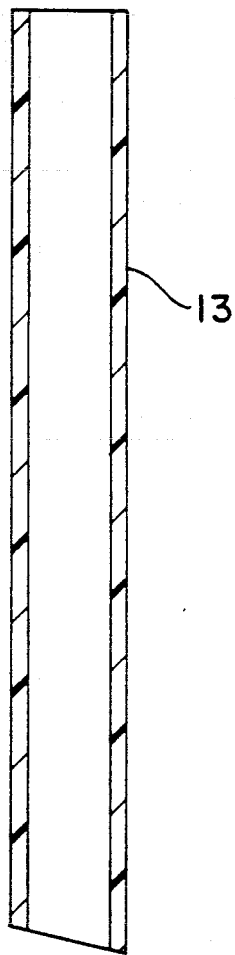
FIG. 3 is a drawing of the water addition tube with a dual purpose level indicator dip stick and tube cap.
Figure 3B:
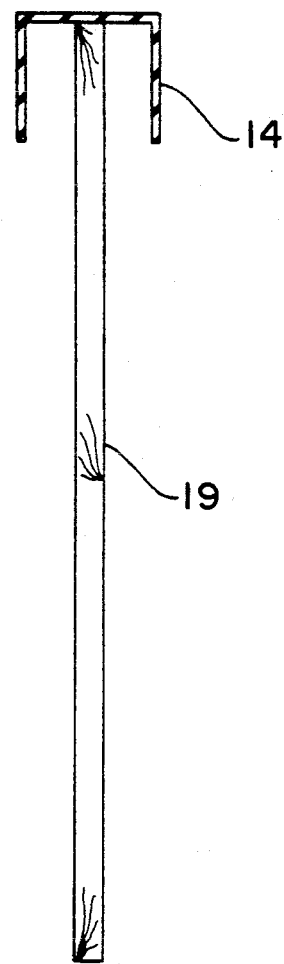

Referring to FIGS. 1, 2, and 3, a preferred embodiment of the invention comprises a vertical, cylindrical vessel 10, a soil support plate 11, water conduit wicks 12, a water addition tube 13, and a reservoir level dip stick with integral cap 14. The embodiment is shown in a fully assembled configuration with absorbent substance 15 and water 17 comingled in the chamber below the soil support plate. A plant 18 is supported within the potting soil 16, and the water conduit wicks 12 extend from the potting soil to the bottom of the lower water reservoir chamber.

The potting soil support plate 11 is equipped with three or more spacer legs 22. The length of the spacer legs 22 are adjusted to provide the volume of water reservoir desired. The volume of water 17 is typically from 15 percent to 50 percent of the volume of the containment vessel 10. The specification of the physical nature or amount of absorbent substance 15 is not an object of the invention. However, the absorbent may advantageously be activated carbon, charcoal, alumina, silica gel, ion exchange resin, or some comingled mixture of these substances.

The statement of materials of construction, physical dimensions, manufacturing technology, assembly procedure, and operating specifics are not specific objectives of the invention. However, the vessel 10, the support plate 11, and the water addition tube 13 may be advantageously produced from substances which are not dissolved, corroded, or decomposed during contact which aqueous solutions. For example, these items may be produced inexpensively by injection molding technology from thermoplastics such as polyethylene, polypropylene, polyvinylchloride, polycarbonate, or polystyrene. The water conduit wicks 12 may be produced from highly stable synthetic fibers such as nylon, polypropylene, polyester, and other similar substances.

An embodiment of the invention may be assembled by cutting the water conduit wicks 12 to a length approximately equal to the depth of the containment vessel 10. The wicks 12 may be passed through the support plate 11 utilizing the conduit holes 23 which are placed in close proximity to the support legs 22. The wicks may be tied or clipped near the bottom of the support legs to prevent curling up against the bottom of the support plate. The length of the support legs 22 may be adjusted to 30% of the height of the containment vessel 10. A volume of absorbent 15 equal to 15% of the volume of the containment vessel 10 may be added to the containment vessel. The support plate with wicks 12 may be inserted into the containment vessel. The water addition tube 13 may be inserted through the conduit hole 24 in the support plate 11, and allowed to stand upon the bottom of the containment vessel 10. The integral assembly water tube cap 14 with level indicator dip stick 19 may be inserted into the water addition tube 13. Approximately 50% of the potting soil 16 may be added to the compartment above the support plate. The water conduit wicks 12 may be arranged symmetrically within this lower 50% of the potting soil. The plant 18 to be supported within the invention may be inserted into the planter, and the remainder of the potting soil 16 may be added around the plant. The initial charge of water 17 with volume equal to 20% of the containment vessel 10 may be added through the addition tube 13.

According to the principles of physical chemistry, the water within the embodiment of the invention will seek a very complex equilibrium in which the fugacity of the water is identical in all components of the system. The principle components of the system include the absorbent substance 15, the conduit wicks 12, the gas phase in the lower chamber below the support plate 11, the potting soil 16, and the plant 18. The equilibrium fugacity is continually changing as a consequence of the osmosis and transpiration rates within the plant 18, different rate of change of ambient temperature within the soil 16 and the lower water reservoir 17, the rate of diffusion and evaporation of moisture from the surface of the soil 16, effect of ambient lighting upon plant photosynthesis, and other phenomena such as elutriation of accumulated salts around the plant roots. Because the equilibrium fugacity continually changes, the flow of water through the conduit wicks is bidirection. For one portion of time, the flow is from the water reservoir into the potting soil. For another portion of time, the flow of water is from the potting soil through the conduit wicks into the water chamber.

Figure 5:
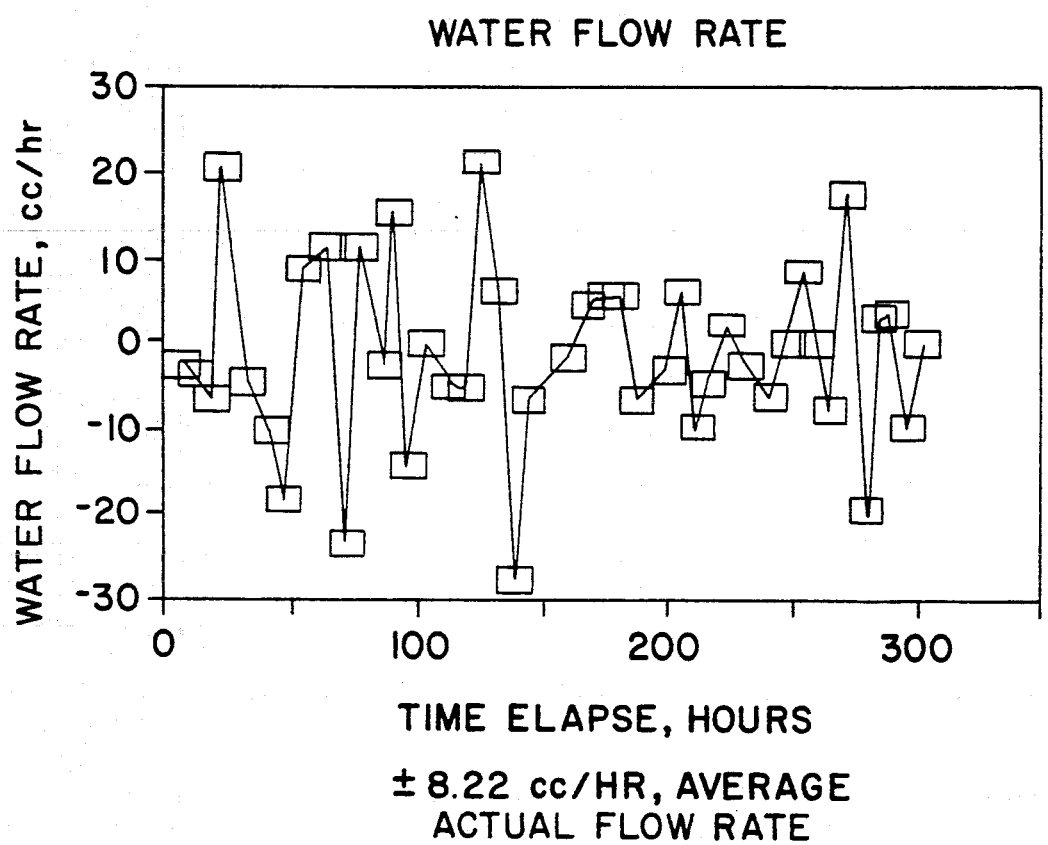
FIG. 5 is a graph which shows the flow rate of water through the wick conduits as a function of time.

An example of the bidirectional water flow was monitored for an embodiment of invention during the time interval of June 5 through June 18, 1986. The containment vessel 10 provided a nominal volume of 9000 cubic centimeters (cc). The planter was supporting a specimen of ornamental NEPHTHYTIS, or White Butterfly, with a maximum growth dimension of 10 inches from the surface of the potting soil. On June 11, 1986, the water level in the reservoir was carefully monitored and observed to vary from 98/32nds inch at 0600, to 100/32nds inch at 1200, to 92/32nds at 1730, and 90/32nds at 23:20. These data are included in the operating data for the planter which was collected during the time interval from 2300 on June 5, 1986, through 1200 on June 18, 1986, and presented in the table in FIG. 6. The cyclical variation of the water level in the planter reservoir is presented graphically in FIG. 4. Although the level of water in the planter reservoir varied as much as 200 cubic centimeters within 24 hours, the average water use was only 0.75 cubic centimeter per hour during the 12 days of observation. The average water flow rate through the conduit wicks between the times of level determination are presented graphically in FIG. 5. This graph illustrates the bidirectional flow rates with an approximate time cycle of 24 hours. The data show that the maximum rate of water flow through the three conduit wicks was either plus 20 or minus 20 cubic centimeters per hour, a rate of 27 times the average rate of water use. The average rate of water flow through the wicks for all time intervals was plus or minus 8.2 cubic centimeters per hour, an average of 11 times the average rate of water use by evaporation and transpiration.

These operating data from said embodiment of invention were obtained in a room maintained at 78 degrees of Fahrenheit temperature. The planter was exposed to indirect window lighting and direct incandescent bulb lighting from 0600 to 2300 each day. The said embodiment of invention was maintained in a darkened room from 2300 through 0600 of each 24 hour cycle. The majority of data indicates that water flow in the said conduit wicks was reversed from the potting soil into the water reservoir by natural phenomena which developed between 2300 and 0600 of each 24 hour period. This fact indicates cessation of normal photosynthesis processes in the plant biochemistry immediately preceeded most instances of 'reverse water flow' through said conduit wicks of said embodiment of the invention.

The phenomenon of bidirectional water flow through the conduit wicks is utilized advantageously by said embodiment of the invention as a means of removing noxious substances from the planter soil. Some noxious substances, such as chemical compounds which contain the hydrosulfide mercaptan molecular group of—SH, may be flushed from the planter soil during time periods of reversed water flow. It is a another established principle of physical chemistry that all substances within the fluid phase of the planter soil will seek an equilibrium chemical potential within the water which flows from the planter soil through the conduit wicks into the water reservoir. Therefore, chemical substances such as mercaptans which cause souring of the planter soil are flushed into the water reservoir of the embodiment of the invention during each time interval of reversed water flow through the conduit wicks. Said noxious chemical compounds may be advantageously absorbed upon said absorbent substances when flushed into said water chamber of said embodiment of the invention.

Whereas a preferred embodiment of the invention has been described in considerable detail to convey the elements of the invention, it is to be understood that various substitutions, alterations, and modifications would be apparent to one of ordinary skill in the art and practicing within the spirit and scope of my claims of invention.

I claim invention as follows:

1. A self-maintenance planter device for nuturing, watering, and purifying the water for plants comprising:
   A. A containment vessel having:
      1. A vertical wall,
      2. A bottom, and
   B. A support plate having:
      1. External dimensions conforming with the shape of the internal periphery of the containment vessel,
      2. At least one aperture for receiving conduit wicks to provide for bidirectional water flow,
      3. One aperture to accommodate a water addition tube, 4. At least one support leg to define a water reservoir in a lower chamber of the containment vessel, and
C. At least one conduit wick having:
   1. A length adequate to provide a conduit of water flow from the bottom of the vessel to the top of support plate,
   2. At least one fastening means to secure said wicks to the lower portion of said support legs, and
D. A water addition tube having:
   1. A length to extend from above the potting soil to the bottom of the containment vessel,
   2. An internal passage to convey refill water into the water reservoir, and
E. A level detection dip stick to indicate water level in said water reservoir vessel, having:
   1. A cap secured to the upper end of said dip stick to cover the water addition tube to decrease the rate of water evaporation from said reservoir, and
F. An absorbent substance having:
   1. An affinity for absorption of noxious substances from water received from the planter soil,
   2. A bulk volume less than the water/absorbent chamber formed below said support plate in the lower chamber of said containment vessel.

* * * * *